United States Patent [19]

Lacoste et al.

[11] Patent Number: 4,690,958

[45] Date of Patent: Sep. 1, 1987

[54] ROAD MARKING COMPOSITIONS

[75] Inventors: Olivier H. V. Lacoste, Brussels, Belgium; Alain De Regel, Paris, France; Hidenori Fujiwara; Raymond C. C. Yap, both of Yokohama, Japan

[73] Assignee: Exxon Chemical Patents Inc., Linden, N.J.

[21] Appl. No.: 832,106

[22] Filed: Feb. 21, 1986

[30] Foreign Application Priority Data

Feb. 22, 1985 [GB] United Kingdom ............... 85-04683
Aug. 28, 1985 [GB] United Kingdom ............... 85-21391

[51] Int. Cl.⁴ ..................... C09D 3/00; C09D 3/733
[52] U.S. Cl. .................................. 523/172; 524/314; 524/321; 524/322; 524/394; 524/499; 106/19
[58] Field of Search ............... 523/172; 524/314, 321, 524/322, 394, 499; 106/19

[56] References Cited

U.S. PATENT DOCUMENTS

| | | | |
|---|---|---|---|
| Re. 30,463 | 12/1980 | Miller et al. | 523/172 |
| 3,337,483 | 8/1967 | Searight et al. | 523/172 |
| 4,119,553 | 10/1978 | Cane et al. | 525/285 |
| 4,289,669 | 9/1981 | Lakshmanan | 524/270 |
| 4,297,450 | 10/1981 | Sato et al. | 523/172 |
| 4,324,711 | 4/1982 | Tanaka et al. | 524/270 |
| 4,459,129 | 7/1984 | Gooding et al. | 524/272 |
| 4,500,661 | 2/1985 | Lakshmanan | 524/272 |

FOREIGN PATENT DOCUMENTS

| | | | |
|---|---|---|---|
| 0056231 | 5/1978 | Japan | 523/172 |
| 0113838 | 10/1978 | Japan | 523/172 |
| 0028436 | 10/1982 | Japan . | |
| 0055989 | 1/1984 | Japan . | |
| 0017355 | 5/1985 | Japan . | |

*Primary Examiner*—Herbert J. Lilling
*Attorney, Agent, or Firm*—J. F. Hunt; J. F. Hunt

[57] ABSTRACT

The inclusion of a substantially saturated dicarboxylic acid, anhydride or ester substituted with at least one hydrogen and carbon containing group of at least 30 carbon atoms and optionally an acidic $C_2$ and/or $C_3$ olefin polymer or copolymer of molecular weight 500 to 30,000 having an acid number from 30 to 300 wt. % of a resin in a resin based hot melt road marking formulation containing aggregate gives a formulation of improved colour and melt viscosity.

14 Claims, 2 Drawing Figures

ROAD MARKING COMPOSITIONS

This invention relates to road marking compositions, in particular hot melt road marking blends of improved colour and viscosity. Road marking compositions consist of aggregate including pigment and a binder resin and it is desirable that the aggregate and the resin have good compatibility both in application and use and that the composition be stable particularly to withstand the high temperatures used in application over an extended time period.

Various hot melt road marking compositions have been proposed, including those using a petroleum resin, aggregate including pigment and additives such as zinc neodecanoate to improve compatibility and stability. U.K. Pat. No. 1426100 discloses using a hot-melt type white traffic paint comprising (A) a certain acid-modified hydrocarbon resin and (B) titanium dioxide.

Japanese patent publication No. 82 028436 is concerned with using a resin mixed with a copolymer of an alpha olefin containing less than 20 carbon atoms and an alpha/beta unsaturated dicarboxylic acid. The copolymer has a melt viscosity of 80–600 at 100° C.

Japanese Patent Publication No. 54036344 relates to using a copolymer of an alpha olefin containing less than 10 carbon atoms with an alpha/beta unsaturated dicarboxylic acid together with a modified petroleum resin. Japanese Patent Publication No. 82028434 uses a mixture of
(1) a hydrocarbon resin
(2) a plasticiser
(3) a copolymer of an alpha olefin containing more than 20 carbon atoms with an alpha/beta unsaturated dicarboxylic acid the alpha olefin may be a polymer of butene.

Japanese Patent Publication No. 82045262 includes a maleic modified petroleum resin mixed with a carboxylic acid such as adipic acid or benzoic acid in hot melt road marking.

Japanese Patent Publication No.85017355 includes a mixture of
(a) a metal salt of a carboxylic acid modified petroleum resin
(b) an unmodified resin
(c) an organic carboxylic acid or anhydride.

Japanese Patent Publication No. 83055989 uses hydrocarbon resins containing aromatic carboxylic acids.

It has also been proposed that polyisobutenyl succinic anhydride be used as a primer coating between a road and the marking formulation to improve adhesion.

We have now discovered a road marking composition which leads to improved wetting of the aggregate particles, has a low melt viscosity, has a long life on the road, is easy and cheap to produce and results in a hot melt road marking composition of good colour.

According to this invention a road marking composition comprises 10 to 30 wt. % of a resin and 90 to 70 wt. % of aggregate and based on the weight of resin 0.1 to 5 wt. % of substantially saturated dicarboxylic acid, anhydride or ester substituted with at least one hydrogen and carbon containing group of at least 30 carbon atoms.

The composition may also contain 0.1 to 05 wt. % (based on the weight of resin) of an acidic $C_2$ and/or $C_3$ olefin polymer or copolymer of molecular weight 500 to 30,000 having an acid number of from 30 to 300.

The molecular weights mentioned in this application are number average molecular weights determined by Gel Permeation Chromatography.

Similar polymer blends are described in European Patent Application No. 004567 and U.S. Pat. Nos. 4,459,129 and 4,289,669 but there is no suggestion that they are compatible with aggregate or useful in road marking compositions.

The resin used in the formulations of this invention may be a petroleum resin or a rosin derivative or a polyterpene or derivatives thereof. Suitable petroleum resin used in the composition of the invention may be obtained by polymerising fractions having a boiling point from −15° C. to 410° C. at atmospheric pressure formed by the thermal cracking of petroleum feedstock. The fractions may be polymerised thermally or in the presence of a catalyst, for example a Friedel-Crafts catalyst such as $AlCl_3$.

Usually the petroleum feedstock, e.g. light naphtha, heavy naphtha, kerosene, gas oil, vacuum gas oil and comprising $C_5$ olefins and diolefins, $C_6$ olefins and diolefins or a mixture of $C_5$ and $C_6$ olefines and diolefins is cracked in the presence of steam and the preferred temperature is between 500° and 900° C.

The products from this cracking usually have a boiling point of −15° C. to 280° C. and may comprise about 30 to 60% olefins, 10 to 30% diolefins, 20 to 50% aromatics and 5 to 20% paraffins and naphthalenes.

Preferably the product is subjected to fractionation to remove $C_2$ to $C_4$ light ends, thermal soaking and distillation to remove hydrocarbons such as cyclic diolefins including cyclopentadiene and methyl cyclopentadiene as dimers.

After thermal soaking and distillation one obtains an overhead naphtha which usually boils at temperatures from 30° to 110° C., e.g. 30° to 80° C. This overhead naphtha comprises mainly $C_5$ diolefins such as isoprene and 1,3 cis- and transpentadienes, $C_5$ to $C_6$ monoolefins and aromatics for example benzene. Generally the overhead naphthas have the following composition but the exact composition obviously depends on the nature of the petroleum feedstock which is subjected to steam-cracking.

|  | % by weight |
| --- | --- |
| Total paraffins | 1.0 to 41.5 |
| Total diolefins | 35.5 to 14.5 |
| Total olefins | 33.5 to 13.0 |
| Total aromatics | 30.0 to 31.0 |
| Isoprene | 16.5 to 6.5 |
| Pentadiene 1,3 | 14.5 to 4.5 |
| Cyclopentadiene | 1.0 to 2.5 |

Alternatively the feed may be a $C_9$ feed which is a mixture of olefinic aromatics such as styrene, vinyl toluene and indene or mixtures of $C_5$ and $C_9$ feeds may be polymerised.

If thermal polymerisation takes place, the fraction, i.e. overhead naphtha, is polymerised usually at a temperature of between 200° C. and 280° C. for 1 to 8 hours. If it is polymerised in the presence of a Friedel-Crafts catalyst, the polymerisation temperature can vary, for example between −80° C. and 120° C., preferably between −10° C. and 80° C., for ¼ to 2 hours.

Friedel-Crafts catalysts such as aluminium trichloride, aluminium trichloride - aromatic hydrocarbon complexes, aluminium tribromide, boron trifluoride, boron trifluoride-phenol complex, titanium chloride, ethyl aluminium chloride, and ferric chloride for example may be used.

These catalysts may be used in the solid, liquid or gaseous state, but it is most convenient to use them as a liquid. Usually, the amount of catalyst which is used is between 0.25 and 3.0 wt. %, preferably 0.5 to 1.5 wt. %, based on the weight of the material to be polymerised.

After polymerisation the residual catalyst may be removed, for example by washing with an aqueous solution of alkali, ammonia or sodium carbonate or by the addition of an alcohol such as methanol and subsequent filtration.

The final resin may then be stripped of unreacted hydrocarbons ("raffinate" rich in benzene and/or paraffins (unreacted olefins) and low molecular weight oily oligomers by steam stripping or vacuum distillation. The finished product usually has a softening point of from 50° to 250° C., especially 120° C. to 170° C.

If desired hydrogenated products of these resins can also be used. Hydrogenation can be performed at a reaction temperature of 150° C. to 250° C., preferably 200° to 2500° C., a hydrogen reaction pressure of 30 to 250 bar, preferably 50 to 100 bar, using a catalyst such as nickel or Raney nickel supported on a diatomaceous earth, alumina, silica gel or pumice carrier, in a solvent such as an aliphatic saturated hydrocarbon, for example hexane or heptane.

In general the preferred resins are aliphatic petroleum resins obtained by polymerising a fraction having a boiling point of $-15°$ C. to 60° C. at atmospheric pressure using a Friedel-Crafts catalyst.

The hydrocarbon resins are solid at ambient temperature and usually have an average molecular weight of 500 to 3000, preferably 700 to 2000, the resins whether hydrogenated or not may be further modified chemically by, for example, reaction with maleic anhydride.

The resins generally contain small amounts, generally 0.1 to 1 wt. % based on the weight of resin of an antioxidant such as the commercially avaialable phenolic antioxidants sold under the Trade Name "Irganox", Irganox 1076 is a particularly preferred antioxidant.

The major component of the road marking composition is aggregate. Aggregate has as essential constituents filler and pigment. The filler can comprise sand, glass beads, mica, cracked stone, calcium carbonate, calcined flint, quartate or crushed marble or a mixture of any of these substances. If a white marking composition is required usually titanium dioxide or whiting is used. For yellow marking compositions, usually lead chromate is used.

Usually the pigment constitutes 3 to 20 wt. % of the aggregate.

The road marking composition preferably comprises 13 to 22 wt. % of petroleum resin and 78 to 87 wt. % of aggregate based on the total weight of resin and aggregate.

Added to the petroleum resin is 0.1 to 5 wt. %, preferably 0.3 to 3 wt. %, more preferably 0.5 to 1.5 wt. % based on the weight of the resin of a substantially saturated dicarboxylic acid, anhydride or ester substituted with at least one hydrogen and carbon containing group containing at least 30 carbon atoms. Preferred are modified polymers or copolymers of substantially saturated dicarboxylic acids, anhydride or ester substituted with at least one hydrogen and carbon-containing group of at least 30 carbon atoms. If more than 5% of the acid, anhydride or ester is added the road marking composition shows a slight tackiness so that when used on the road it becomes dirty very quickly. We prefer that for best abrasion resistance the resin contain 0.25 to 0.35 wt. % of the substantially saturated dicarboxylic acid, anhydride or ester.

When such a polymer or copolymer is used typical anhydrides or esters include those represented by the formulae

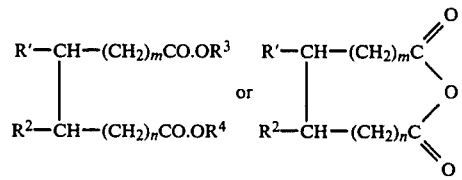

where R' and R² are hydrogen- or a hydrogen- and carbon-containing group of at least 30 carbon atoms provided they are not both hydrogen, m and n are zero or integers and R³ and R⁴ are hydrogen or hydrocarbyl groups.

It is preferred that R² be hydrogen and that m and n be zero or a small integer, e.g. 1 or 2. In general acids or anhydrides are preferred to esters. However if an ester is used it is preferred that R³ and R⁴ are alkyl groups, especially a C₁ to C₅ alkyl group, for example, methyl, ethyl or propyl. If desired however the ester could be derived from a glycol in which case R³ and R⁴ would not be separate hydrocarbyl groups, but instead, the residue of a glycol, for example ethylene glycol or propylene glycol.

The most preferred compounds are those where R' contains 40 to 200 carbon atoms and where R' has no atoms other than carbon, hydrogen and halogen, and especially when it only contains carbon and hydrogen atoms, i.e., it is a hydrocarbyl group. Preferred hydrocarbyl groups are aliphatic groups.

The acid, anhydride or ester has to be substantially saturated, but the substituent group, for example the group R' may be unsaturated. In practice it is preferred that the substituent group be a polymer or a monoolefin, for example a C₂ to C₅ monoolefin, such as polyethylene, polypropylene or polyisobutene.

Such polymers will usually have only one double bond so that they could be regarded as predominantly saturated, especially since they must have at least 30 carbon atoms.

The most preferred acid or anhydride for addition to the road marking composition is one of the formula

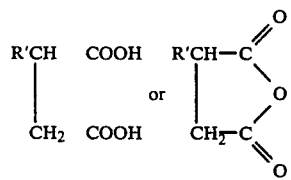

especially where R' is polyisobutenyl, i.e. a polyisobutenyl succinic acid or anhydride, preferably where R' has 30 to 200 carbon atoms, especially 45 to 55 carbon atoms, such anhydrides are frequently known as PIBSA.

Whilst we find that the addition of the acid or anhydride reduces the melt viscosity of the road marking formulation and improves the wetting of the aggregate we find that the compositions paticularly for white road marking can have an undesirable yellow colour. In addition it can at times result in a lowering of the softening point and a tacky surface. We have found that the further addition of an acidic $C_2$ and/or $C_3$ modified olefin polymer or copolymer of molecular weight from 500 to 30,000 and having an acid number of from 30 to 300 can result in a significant improvement in the colour of the composition without any significant adverse effect on the melt viscosity. Use of the acid modified polyolefin without the acid or anhydride can result in an undesireable increase in the melt viscosity of the formulation. 0.1 to 10 preferably 0.5 to 2.0 parts by weight of the acidic polymer is used per part of the $C_4$ polymer or copolymer.

The acid modified olefin polymer or copolymer used may be prepared in any suitable way although the preferred way is by copolymerisation of the olefin generally with an ethylenically unsaturated acid such as acrylic acid or methacrylic acid or by hydrolysis of an olefin/unsaturated ester copolymer such as an ethylene vinyl acetate copolymer or by the grafting of a carboxyl containing material on to an olefin preferably ethylene polymer or copolymer. Polyethylene, polypropylene and ethylene propylene copolymer waxes and Fisher Tropsch and microcrystalline waxes are especially suitable. The molecular weight of the acid modified polyolefin should be in the range 500 to 30,000 to ensure compatibility with the resin and to minimise the impact of the presence of the acid modified polyolefin on the viscosity of the composition. The acid value of the acid modified polyolefin (as measured by milligrammes of KOH per gram) should be below 300 preferably below 200 since the use of products with higher values tends to result in an undesirable yellowness in the product. The road marking composition may contain other components for example 1 to 5 wt. % of an oil for example a mineral oil especially a naphthenic or natural oils such as linseed oil, soya oil and other vegetable oils.

The road marking composition is prepared by blending the components together. This may be achieved by dry blending or, as is preferred, the petroleum resin is heated until molten and then the other components (e.g. sand, cracked stone, pigment) are added with thorough stirring. The mixture is then allowed to cool. To apply the composition to a road or other surface it is reheated and placed on the surface, whence on cooling it will be found to have a good adhesion to the surface and good wear resistance.

EXAMPLE 1

The resin was one obtained by the polymerisation using an $AlCl_3$ catalyst of a petroleum feedstock comprising mainly $C_5$ and $C_6$ olefins and diolefins marketed by Esso as Escorez 1102.

The aggregate consisted of:

| | | |
|---|---|---|
| Titanium dioxide | 8.4% | |
| Whiting | 16.8% | |
| Glass beads | 16.8% | |
| Mimgrain 4 (a sand) | 16.8% | |
| Gross aggregate | 6.1% | |
| Z30 sand | 16.8% | |
| GZ sand | 16.8% | |
| Plastorit (a skid resistant mica) | 1.5% | | the percentages being by weight.

A series of Escorez 1102 resins containing 0.2 wt. % Irganox 1076 were prepared containing as additives varying amounts of PIBSA 112 obtained by condensing a chlorinated polybutene of molecular weight about 900 with succinic anhydride and, for comparison, oil and zinc decanoate. These resins were used in road marking compositions having the following ingredients.

| | |
|---|---|
| Resin | 17% by weight |
| Naphthenic oil (Shellflex) | 4% by weight |
| Aggregate | 79% by weight |

The viscosity of these hot melt road marking formulations was found to be as shown in Table 1 from which it can be seen that up to a 3% level, the viscosity when using PIBSA is superior to that with Zinc neodecanoate and both are superior to the use of the naphthenic oil alone.

TABLE 1

| | Additive Used | | |
|---|---|---|---|
| Wt. % of Additive (Based on Resin) | Oil | Zn Neodecanoate | PIBSA |
| | ZAHN Viscosity of formulation at 180° C.,s | | |
| 0 | 54 | 54 | 54 |
| 0.2 | 53.5 | 52 | 41 |
| 0.5 | | 48 | 36 |
| 1 | 51 | 45 | 32 |
| 2 | | 39.5 | |
| 3 | 46 | 30 | 29 |
| 7 | 35 | 20 | 22 |

EXAMPLE 2

The effects of adding PIBSA and Zinc neodecanoate on the resin compatibility were tested, the PIBSA being the same as used in Example 1. Two lots of the resin similar to that used in Example 1 were used to allow for variations between lots.

It can be seen from Table 2 that PIBSA always gives better results than Zinc neodecanoate and is no different as regards softening point.

Figure 1:
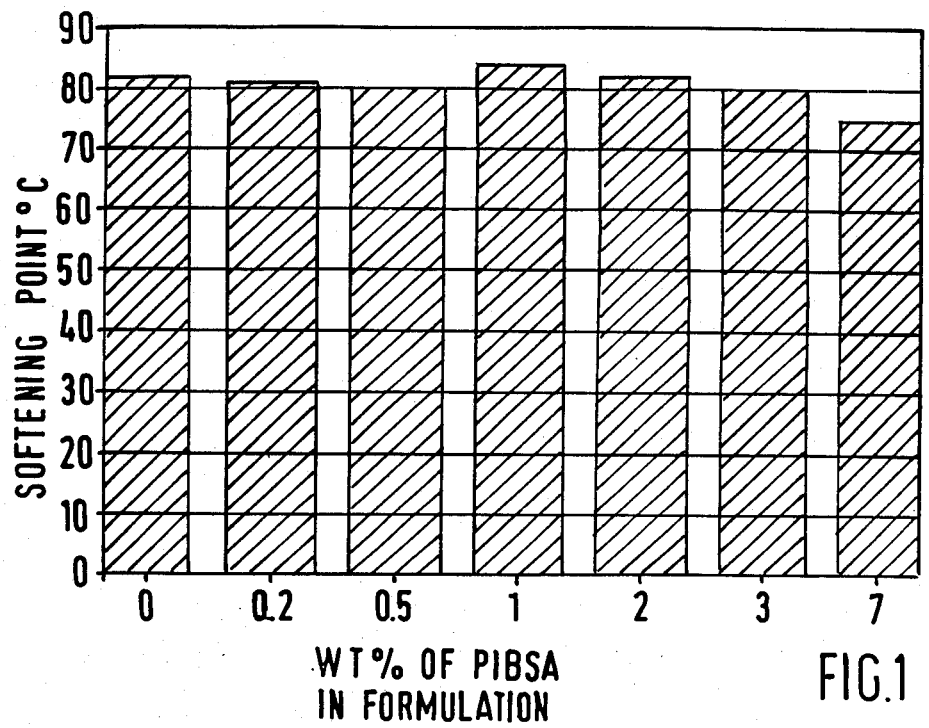
FIG. 1 illustrates the effect PIBSA has on the hot melt road marking softening point.

From FIG. 1 it can also be seen that up to 3% addition of PIBSA has virtually no effect on the hot melt road marking softening point.

TABLE 2

| | Lot 1 | Lot 2 |
|---|---|---|
| Hot melt road marking | | |
| cloud point | 250° C. | 60° C. |
| SP, °C. | | 95° C. |
| Mw | 8230 | 2933 |
| Mn | 1870 | 1194 |
| Mz | 43700 | 7097 |
| Mw/Mz | 4.40 | 2.4 |
| Resin + 0.2% neodecanoate | | |
| T1[(1)] | 181° C. | 161° C. |
| T2[(1)] | 211° C. | 180° C. |
| T | 30° C. | 21° C. |
| ZAHN Viscosity[(2)] | 52 s | 20 s |
| Softening Point, °C. | 80 | 71 |
| Resin + 0.2% PIBSA | | |
| T1[(1)] | 177° C. | 159° C. |

TABLE 2-continued

|  | Lot 1 | Lot 2 |
|---|---|---|
| T2[1] | 202° C. | 176° C. |
| T | 25° C. | 27° C. |
| ZAHN Viscosity[2] | 41 s | 17 s |
| Softening Point, °C. | 81 | 71 |

[1]T1 and T2 values: measured with a Zahn viscometer
T1: is the temperature at which the Zahn cup of the viscometer is empty after 20 seconds with shaking.
T2: is the temperature at which the Zahn cup of the viscosimeter is empty after 20 seconds without shaking.
[2] measured at 180° C.

EXAMPLE 3

The influence of PIBSA compared with that of Zinc neodecanoate on the resistance of the formulation to abrasion was determined using a Taber Abrasimeter according to British Standard BS 3262:1976.

Figure 2:
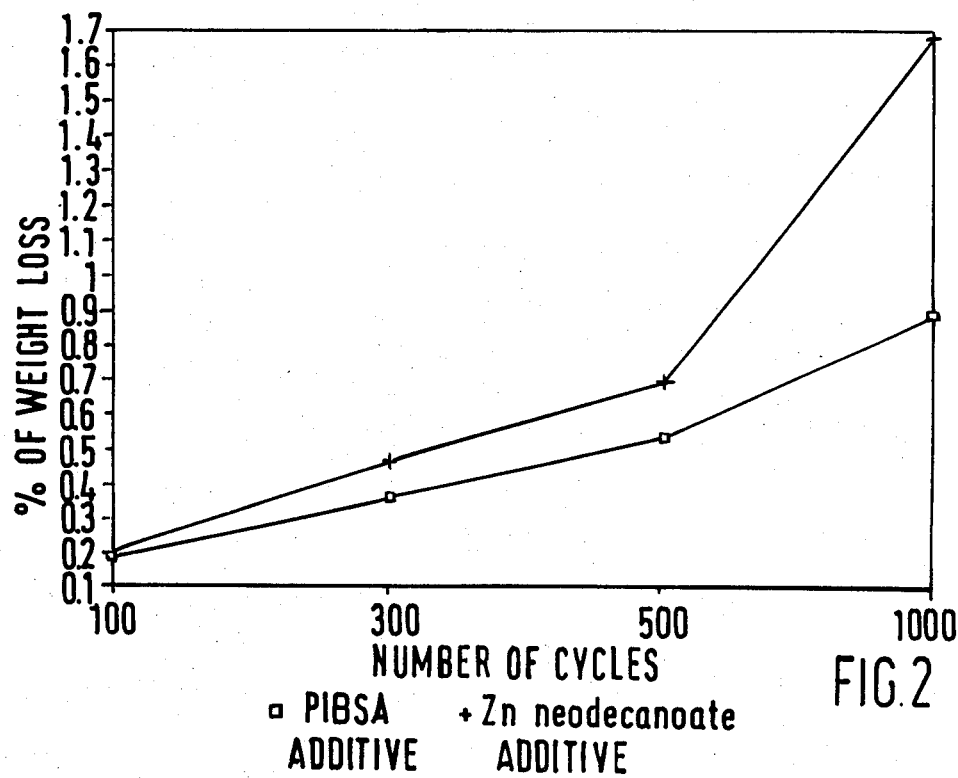
FIG. 2 shows the abrasion resistance comparing PIBSA with that of zinc neodecanoate.

The results in FIG. 2 shows that there is superior adhesion between the binder and the aggregate particles when using PIBSA leading to.
(1) A longer retroreflectivity duration because the holding of the glass beads by the binder is better.
(2) Improved anti skid resistance due to better holding of the filler by the binder.
(3) The duration of the marking (lower erosion of the stripe) is longer.

EXAMPLE 4

A hot melt road marking formulation was prepared using Escorez 1102 as the resin and having the following composition.

|  | Wt. % |
|---|---|
| Resin | 17 |
| TiO2 | 8 |
| Sand | 19 |
| Glass beads | 15 |
| CaCo3 | 38 |
| Esso Medium Base B | 2 |
| Polyethylene wax | 1 |
| Irganox 1076 | 0.1 |

To this were added various amounts of PIBSA 112 and an acid modified polyethylene wax commercially available from Mitsubishi Chemical Industries as DIACRNA 30 (DCA-30). The viscosity of the hot melt road marking formulations at 180° C. were measured using a Brookfield thermocell Viscomerer at a shear rate of 0.42 sec $^{-1}$ on a 10 cc sample and the Hunter equation for the calculation of Yellowness Index (YI) measured on samples prepared according to test JIS K 5400 (79) 6.5(4) on a Nippon Denshoku HD-1001 colorimeter. The results obtained are set out in Table 3.

TABLE 3

| Additives | 1 | 2 | 3 | 4 | 5 | 6 | 7 | 8 | 9 |
|---|---|---|---|---|---|---|---|---|---|
| PIBSA 112, wt. % | — | 0.3 | — | — | — | 0.4 | 0.3 | 0.2 | 0.3 |
| DCA-30, wt. % | — | — | 0.3 | 0.5 | 1.5 | 0.1 | 0.2 | 0.3 | 0.3 |
| Test Results: |  |  |  |  |  |  |  |  |  |
| Viscosity 180° C., poise | 34.8 | 14.0 | 42.0 | 46.8 | 200 | 17.3 | 17.4 | 35.4 | 18.0 |
| Yellowness Index | 0.16 | 0.13 | 0.106 | 0.092 | 0.079 | 0.081 | 0.0983 | 0.089 | 0.07 |

We claim:
1. A road marking composition comprising 10 to 30 wt. % of a resin and 90 to 70 wt. % aggregate and, based on the weight of resin 0.1 to 5 wt. % of a substantially saturated dicarboxylic acid, anhydride or ester, substituted with at least one hydrogen-and carbon containing group of at least 30 carbon atoms, wherein said resin comprises a petroleum resin, a rosin derivative, a polyterpene, or derivatives thereof.

2. A composition according to claim 1 wherein said resin is a petroleum resin obtained by polymerising fractions having a boiling point from −15° C. to 410° C. at atmospheric pressure formed by the thermal cracking of petroleum feedstock.

3. A composition according to claim 1 wherein said aggregate comprises 3–20 wt. % pigment.

4. A composition according to claim 1 comprising 13 to 22 wt. % of petroleum resin and 78 to 87 wt. % of aggregate based on the total weight of resin and aggregate.

5. A composition according to claim 1 wherein said resin is a petroleum resin and the amount of acid, anhydride, or ester is 0.3 to 3 wt. % based on the weight of petroleum resin.

6. A composition according to claim 1 wherein the acid, anhydride ester has the formula

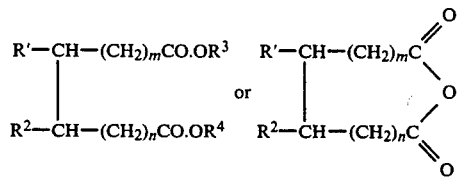

where R' is a $C_{40}$ to $C_{200}$ hydrocarbyl group, $R^2$ is a hydrogen-and-carbon containing group of at least 30 carbon atoms or hydrogen, m and n are zero or integers and $R^3$ and $R^4$ are hydrogen or hydrocarbyl groups.

7. A composition according to claim 6 wherein $R^2$ is hydrogen, m and n are zero and $R^3$ and $R^4$ are alkyl groups.

8. A composition according to claim 6 where R' is a polymer of a $C_2$ to $C_5$ monoolefin.

9. A composition according to claim 1 wherein the acid or anhydride has the formula

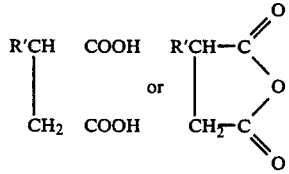

and R' has 45 to 55 carbon atoms.

10. A composition according to claim 1 also containing 0.1 to 5 wt. % (based on the weight of resin) of an acidic $C_2$ and/or $C_3$ olefin polymer or copolymer of molecular weight 500 to 30,000 having an acid number from 30 to 300.

11. A composition according to claim 9 containing from 0.1 to 10 parts by weight of the acidic $C_2/C_3$ olefin polymer or copolymer per part of the substantially saturated dicarboxylic acid, anhydride or ester substituted with at least one hydrogen and carbon containing group of at least 30 carbon atoms.

12. A composition according to claim 5 wherein the amount of said acid, anhydride, or ester is 0.5 to 1 wt. % based on the weight of petroleum resin.

13. A composition according to claim 2 wherein said petroleum resin is an aliphatic petroleum resin obtained by polymerising a fraction having a boiling point of $-15°$ C. to $60°$ C. at atmospheric pressure using a Friedel-Crafts catalyst.

14. A composition according to claim 13 wherein said aggregate comprises 3–20 wt. % pigment.

* * * * *